(No Model.)
R. S. JENNINGS.
Veneer Fabric.
No. 241,866.
Patented May 24, 1881.
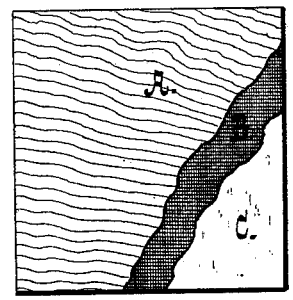
WITNESSES.
W. A. Bertram.
C. M. Armstrong.
INVENTOR
Ralph S. Jennings.
BY
R. D. Williams
ATTORNEY.

UNITED STATES PATENT OFFICE.

RALPH S. JENNINGS, OF BALTIMORE, MARYLAND.

VENEER FABRIC.

SPECIFICATION forming part of Letters Patent No. 241,866, dated May 24, 1881.

Application filed March 8, 1881. (No model.)

*To all whom it may concern:*

Be it known that I, RALPH S. JENNINGS, of Baltimore city, State of Maryland, have invented certain new and useful Improvements in Veneer Fabrics; and I hereby declare the same to be fully, clearly, and exactly described as follows, reference being had to the accompanying drawing, in which is illustrated, in plan view, a composite fabric embodying my present invention.

My said invention relates to composite materials or fabrics designed to be used for various purposes, such as in the manufacture of packages, bags, or packing-cases, and for numerous other uses for which its properties fit it.

Fabrics of this class have heretofore generally been made by cementing together two or more layers of wood veneer, with the grain of one layer crossing that of the contiguous one, or by cementing to or between the veneers a sheet of textile fabric. These veneer sheets are very pliable in a plane substantially at right angles to the grain, but extremely stiff in the direction of the grain, so that the composite sheet formed of two or more layers having the grain crossed is very stiff in all directions—so stiff, indeed, as to be bent with considerable difficulty—and this feature is an obstacle in the use of the material in cases where pliability is a desideratum. To dispense with one of the veneer sheets, or to cement them together with the grain parallel, is an expedient which would obviate this difficulty, but at such a cost, in respect to weakening the fabric, that it has never been resorted to. The textile-fabric cover will prevent the material from parting entirely when the wood cracks or splits, but, from the "stretchy" nature of all textile fabrics, they add but little, if at all, to the tensile strength of the composite fabric. In a word, the wood has very little strength across the grain, and this little is not materially increased by the textile fabric.

I have devised a composite fabric which is at once tough, strong, and pliable, and eminently fitted for the manufacture of packages or cases to be used in lieu of ordinary bagging.

In practice I cement together a layer of wood veneer, A, a textile fabric, B, and a sheet of tough strong paper, C. The wood is, by preference, "gum," as it approximates more nearly to a grainless wood than any other with which I am acquainted, and bends when in the form of veneer nearly as readily with the grain as across it, and for the textile fabric I find burlap answers well. It is cheap and strong, and may be found in quantities, in the form of old cotton-bale covers or bagging, in the hands of dealers in junk and paper-stock. The paper I use is tough manila. The cement permeates the burlap, binding the three layers strongly together. The tensile strength of the paper, which will not give materially, prevents the wood from splitting under all ordinary circumstances, and should the wood split or crack, the burlap prevents the fabric from parting entirely. The composite fabric is particularly fitted for the manufacture of packages for fertilizers, especially for those of the acid or superphosphate class, as the wood or paper (either being inside) is practically proof against the attack of the acid, which so speedily rots the bagging; besides, the wood and paper are not readily pervious to water, and no such care is necessary in keeping the fertilizers under shelter as is requisite in the case of bagged guano. While the order of arrangement named—viz., wood, burlap, and paper— is preferred, the materials may be otherwise arranged.

I am aware that a fabric consisting of two or more sheets of veneer cemented together with the grain crossed and backed with paper and cloth is old, and such I do not claim. It is, indeed, open to the very objection which it is the design of my invention to obviate.

What I claim is—

1. A composite veneer fabric of wood, textile fabric, and paper cemented together, as set forth.

2. A composite veneer fabric consisting of sheets of wood, textile fabric, and paper cemented together in the order named, as set forth.

RALPH S. JENNINGS.

Attest:
R. D. WILLIAMS,
W. A. BERTRAM.